United States Patent [19]
Reaves, Jr.

[11] 3,818,329
[45] June 18, 1974

[54] CABLE TESTING CIRCUIT EMPLOYING A PAIR OF DIODES TO DETECT SPECIFIC CONDUCTOR PAIR CONDITIONS

[75] Inventor: A. Lee Reaves, Jr., Clarendon Hills, Ill.

[73] Assignee: Western Electric Company, Incorporated, New York, N.Y.

[22] Filed: Aug. 1, 1972

[21] Appl. No.: 277,055

[52] U.S. Cl. .................................. 324/51, 324/66
[51] Int. Cl. ............................................ G01r 31/02
[58] Field of Search ......... 324/51, 66, 73, 110, 119, 324/132, 133, 72.5

[56] References Cited
UNITED STATES PATENTS

| | | | |
|---|---|---|---|
| 2,571,458 | 10/1951 | Lawrence et al. | 324/119 X |
| 2,666,898 | 1/1954 | Meldal | 324/66 |
| 2,822,519 | 2/1958 | Murphy | 324/66 |
| 2,964,701 | 12/1960 | Argabright | 324/66 X |
| 3,375,334 | 3/1968 | Robinson | 324/66 X |
| 3,426,274 | 2/1969 | Wise | 324/110 |
| 3,657,649 | 4/1972 | Odorici | 324/132 X |

FOREIGN PATENTS OR APPLICATIONS

| | | | |
|---|---|---|---|
| 193,003 | 11/1957 | Austria | 324/66 |
| 130,580 | 11/1959 | U.S.S.R. | 324/66 |
| 709,737 | 6/1954 | Great Britain | 324/66 |
| 977,813 | 4/1951 | France | 324/66 |

Primary Examiner—Gerard R. Strecker
Attorney, Agent, or Firm—William H. Kamstra

[57] ABSTRACT

A test circuit in which the difference between the junction resistances of a pair of semiconductor diodes when forward biased and when reverse biased is employed to detect whether a conductor pair of an electrical cable is good, open, shorted, or reversed. A first and a second test bridge, one including a first of the diodes, a potential source, and a current level indicator, the other including only the second diode, are connected across the ends, respectively, of the conductor pair under test. The functional state of the conductor pair is read from the current level indicated.

8 Claims, 1 Drawing Figure

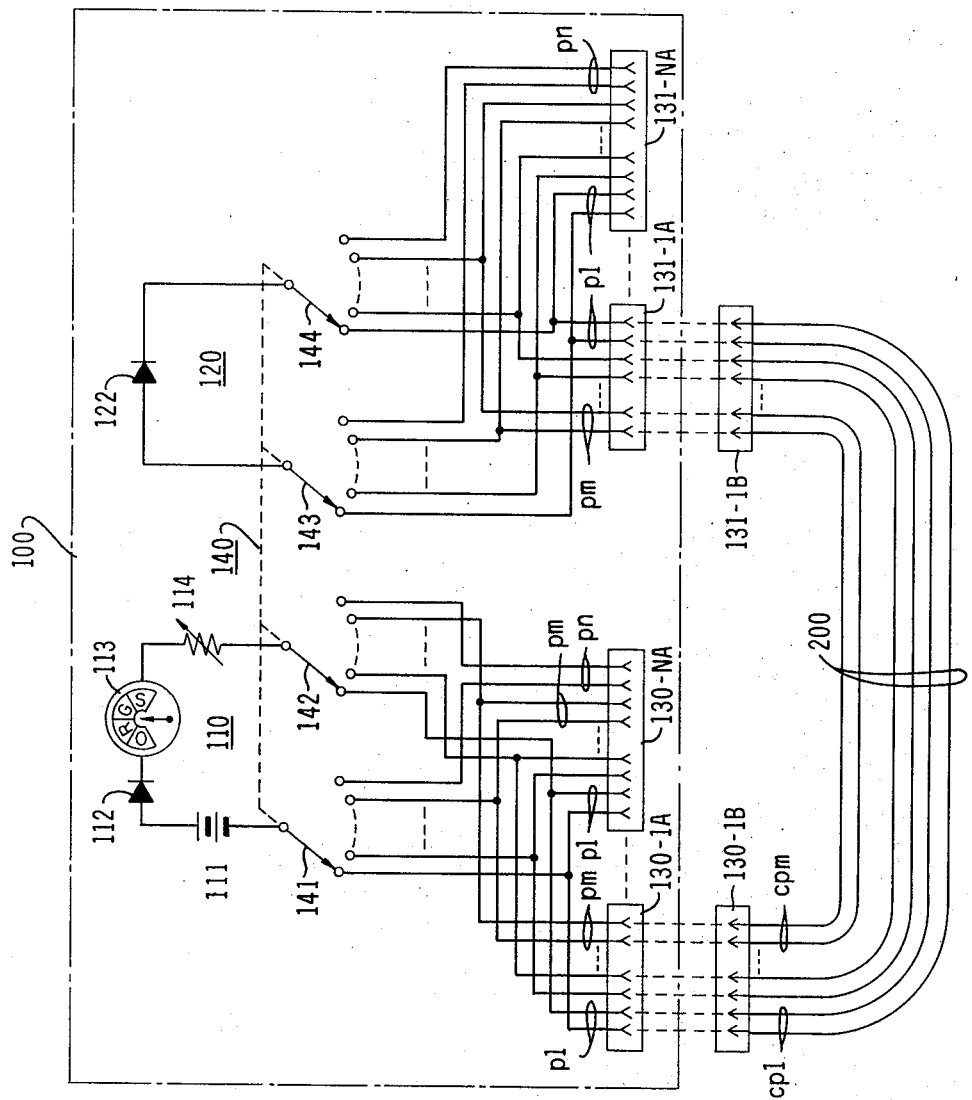

CABLE TESTING CIRCUIT EMPLOYING A PAIR OF DIODES TO DETECT SPECIFIC CONDUCTOR PAIR CONDITIONS

BACKGROUND OF THE INVENTION

This invention relates to electrical circuits for testing electrical apparatus and more particularly to such circuits for testing the operative conditions of electrical cables.

Electrical cables made up of many individual conductor pairs and having connectors at each end are universally employed to interconnect separate components of electronic systems. Being connectorized, they are readily installed and as readily replaced and may take a number of forms as may be convenient for a particular interconnection application. Cables formed of conductor pairs grouped by embedding in an insulating tape, or by interwinding, for example, are well-known. The number of conductor pairs, which in many cases is large, may also differ widely from cable to cable as may the lengths of the cables. To ensure their reliability in the completion of many complex circuits between system components, the cables must be carefully tested after manufacture and before each installation. During the manufacture and installation, conductor pairs of a cable may be rendered defective in a number of ways. A conductor could have an open, a conductor pair could be internally shorted, or a conductor pair could be reversed, that is, the pair could be connected to other than corresponding terminal pins of the terminating connectors.

Obviously an open conductor or even an internally shorted conductor pair is readily detected by any suitable resistance measuring device long available in the art. The problem is presented, however, of rapidly and positively testing a large number of conductor pairs for not only these conditions, but for the conductor pair reversed condition as well without the laborious necessity of making many individual test connections with a number of test instruments.

SUMMARY OF THE INVENTION

According to one illustrative embodiment of this invention, a simple and economical test circuit examines each of a plurality of conductor pairs making up a cable for the following operative conditions: conductor pair good, conductor pair reversed, conductor pair shorted, and either or both of the conductors of a pair open. Essentially, this test is accomplished by detecting the difference between the forward and reversed biased junction resistance values of two diodes included in the test circuit. A pair of receptacles is provided for each terminating connector of a cable, one receptacle having terminal pairs switchable to a first end test bridge including, in series, a source of potential, a first of the diodes, an ammeter, and a potentiometer. The other receptacle has corresponding terminal pairs switchable to a second end test bridge including only the second of the diodes. The two diodes are forward biased so that, as the two test bridges are switched to complete a circuit through the conductor pair under test, a current of a particular magnitude is present through the diodes in the forward direction if the conductor pair is good. This current magnitude is indicated as a reading on the ammeter. Conversely, an open in either or both conductors of a pair will be indicated as no current reading on the ammeter.

Should the conductor pair be reversed in its connections to one of the terminal pairs of one of its connector plugs, a relatively low current is indicated because the second diode, now being back biased, passes only leakage current. Finally, an internal short in a conductor pair permits the highest current reading since the only diode resistance is that of a single forward biased diode, the other having been shunted by the short. Advantageously, the ammeter may indicate only operative conditions of the conductor pairs rather than absolute current values. A simple yet effective circuit is thus presented which incorporates in one instrument the means for detecting virtually all of the defects normally encountered in multiple conductor cables. The invention thus achieves substantial savings in both time and cost of test equipment and greatly facilitates what frequently constitutes a tedious test operation.

BRIEF DESCRIPTION OF THE DRAWING

The organization and operation of this invention will be better understood from a consideration of the detailed description of one illustrative embodiment thereof which follows when taken in conjunction with the accompanying drawing, the single FIGURE of which depicts in schematic form its circuit details and a typical multiple conductor cable under test.

DETAILED DESCRIPTION

In the drawing one specific test circuit 100 according to the principles of this invention is shown having test connected thereto a cable 200. The test circuit 100 essentially comprises a first and a second test bridge 110 and 120, the first having serially included therein a source of potential 111, a first diode 112, ammeter indicating means 113, and a potentiometer 114. The second test bridge 120 includes only a second diode 122. The diodes 112 and 122 are, in this embodiment of the invention, semiconductor diodes of the junction type having different resistances when forward and reverse biased. The bridges 110 and 120 are selectively extendable to termination pairs of a plurality of connector receptacles 130-1A through 130-NA and 131-1A through 131-NA via the ganged wipers and contacts of a multilevel switch 140. Specifically, the two ends of test bridge 110 are connected, respectively, to the pair of wipers 141 and 142 and the two ends of test bridge 120 are connected, respectively, to the pair of wipers 143 and 144. The two pairs of switch wipers are simultaneously and selectively movable to associated contacts extended via multipled leads to terminal pairs of the receptacles 130 and 131. A first contact of each of the first two levels of switch 140 to which the wipers 141 and 142 are shown as set, for example, are extended, respectively, to the first terminal pair $pl$ of receptacle 130-1A, which receptacle includes a plurality of terminal pairs $pl$ through $pm$, and to the first terminal pair $pl$ of receptacle 130-NA, which receptacle includes a plurality of terminal pairs $pl$ through $pn$. Similarly, a first contact of each of the second two levels of switch 140 to which the wipers 143 and 144 are shown as set, are extended, respectively, to the first terminal pair $pl$ of receptacle 131-1A, which receptacle includes a plurality of terminal pairs $pl$ through $pm$, and to the first terminal pair $pl$ of receptacle 131-NA, which receptacle includes a plurality of terminal pairs *pl* through *pn*.

Although only representative pairs of receptacles 130 and 131 are shown in the drawing, the pairs having a differing number of terminal pairs, it will be appreciated, than any reasonable number of receptacle pairs may be accommodated as dictated by the range of cable capacities normally encountered for testing. In any case, the contacts of switch 140 served by the wipers 141 and 142 are multipled, respectively, to the terminals of corresponding terminal pairs of each of the receptacles 130-1A through 130-NA, the latter receptacle, which has the greatest number of terminal pairs, having at least one exclusive contact on each of the first two levels of switch 140. Similarly, the contacts of switch 140 served by wipers 143 and 144 are multipled, respectively, to the terminals of corresponding terminal pairs of each of the receptacles 131-1A through 131-NA, the latter receptacle also having at least one exclusive contact on each of the second two levels of switch 140.

A cable 200 having a plurality of conductor pairs cpl through cpm is shown in the drawing by dashed lines interconnections as being under test by the test circuit 100 by means of end connector plugs 130-1B and 131-1B, which plugs may be assumed as inserted in the matching receptacles 130-1A and 131-1A, respectively. For purposes of describing a typical operation of the illustrative test circuit 100, it will be assumed that the conductor pair cpl of cable 200 is to be tested, the switch wipers 141 through 144 already being properly positioned. A circuit for this test may be traced from one end of the test bridge 110 at the wiper 141 to the other end of the same bridge at the wiper 142 as follows: a first terminal of the terminal pair pl of receptacle 130-1A, corresponding conductor of conductor pair *cpl* of cable 200, corresponding terminal of terminal pair pl of receptacle 131-1A, wiper 143, diode 122, wiper 144, the other terminal of terminal pair pl of receptacle 131-1A, the other conductor of conductor pair cpl, the other terminal of terminal pair *pl* of receptacle 130-1A, wiper 142, potentiometer 114, meter 113, diode 112, and potential source 111. If the conductor pair *cpl* is sound, the insertion of its terminating connector plugs in the matching receptacles as described will cause a current flow of a magnitude as determined by the resistance of the loop described above, including the junction resistance of the forward biased diodes 112 and 122. A reading of this current magnitude on the ammeter 113 is indicative that the conductor pair *cpl* has passed the test.

Assume now that the individual conductors of the conductor pair *cpl* have been reversed during manufacture, for example. That is, the connections of either of the ends of conductor pair *cpl* have been made to opposite terminals of connector plugs 130-1B or 131-1B rather than to corresponding ones. Assuming further that the reversal occurred at the connector plug 131-1B, the current present in the test bridge 120 will then be in a direction opposite to that during the conductor good test described in the foregoing. As a result, diode 122 is now back biased and accordingly presents a junction resistance many orders greater than diode 112 which remains forward biased and presents a normal resistance to the circuit current flow. This resulting current is read on meter 113 as of a magnitude between zero and that of the conductor good current level considered above. Should now an internal short exist between the conductors of conductor pair *cpl*, the bridge 120 including any resistance of diode 122, will not appear in the test loop. With the forward biased junction resistance of diode 122 removed, the current reading on meter 113 will be the highest of the readings so far indicated. Finally, an open in either of the conductors of conductor pair *cpl* will prevent any current flow in the test loop with a resulting zero indication on the meter 113.

With a test of conductor pair *cpl* thus completed, succeeding conductor pairs of cable 200 may be tested by rotating the switch 140 wipers counterclockwise as viewed in the drawing, to next succeeding contact positions and reading the current magnitude present for each switch setting on meter 113. Since the switch 140 contacts agree in number with the number of terminal pairs of the largest capacity receptacle pair 130-NA and 131-NA, a switch position may be reached where no conductor pair of a cable is present for test. Obviously, in this case further zero readings on meter 113 will indicate that the conductor capacity of a cable under test has been passed.

Advantageously, the readings on meter 113 indicative of the four categories of conductor pair conditions considered, lend themselves to a simple indexing. Thus, since the current magnitudes for these conditions range in graded steps from zero to a maximum value, the meter 113 may be calibrated to indicate "0" (open), "R" (reversed), "G" (good), and "S" (short), in that order in view of the current levels considered in the foregoing. The potentiometer 114 is used to adjust the meter for the varying resistance introduced by varying cable lengths. Circuit means are also readily devisable by one skilled in the art in which conductor pair conditions are visually indicated other than by a meter. Indicator lights, for example, could be provided, each responsive to a different current level, for marking the conductor pair conditions. The test circuit 100 may be further modified for particular test applications within the principles of this invention. Although a plurality of multipled receptacle pairs are shown and described, a single pair of all-purpose receptacles may be found convenient where the scope of the tests permit. What has been described is thus to be considered only one specific embodiment of this invention and various other arrangements may also be devised by one skilled in the art without departing from the spirit and scope thereof as defined by the accompanying claims.

What I claim is:

1. An electrical test circuit comprising a first test bridging circuit adapted to bridge one end of a conductor pair, said first bridging circuit and said one end of said conductor pair each having electrical terminal means for completing a conducting path including the ends of said first bridging circuit and the one ends of the conductors of said conductor pair, respectively, said first bridging circuit comprising a source of potential, a first diode having a first resistance when forward biased and a second resistance when reverse biased, and current level sensing means; and a second test bridging circuit adapted to bridge the other end of said conductor pair, said second bridging circuit and said other end of said conductor pair having electrical terminal means for completing a conducting path including the ends of said second bridging circuit and the other ends of the conductors of said conductor pair corresponding to said one ends of said conductor pair, respectively, said second bridging circuit comprising a second diode also having a first resistance when forward biased and a second resistance when reverse biased, said first and second bridging circuit and said conductor pair defining a first electrical circuit having a current present therein having levels as determined by the continuity of said conductor pair when said first and second diodes are forward biased and the reversal of said conductor pair when said second diode is reverse biased, said first bridging circuit and portions of said conductor pair defining a second electrical circuit shunting said second diode having a current present therein having a level as determined by the presence of a short between the conductors of said conductor pair.

2. An electrical test circuit as claimed in claim 1 in which said first test bridging circuit also comprises potentiometer means for calibrating said current level sensing means.

3. An electrical test circuit as claimed in claim 2 in which said current level sensing means comprises an ammeter means.

4. An electrical test circuit for testing an electrical cable having a plurality of conductor pairs comprising a first and a second test bridging circuit each including a unilateral conducting element having a first resistance when forward biased and a second resistance when reverse biased, said first bridging circuit also including a potential source and current level sensing means, and switch means for selectively connecting said first and second bridging circuits across one and the other end, respectively, of individual ones of said conductor pairs, said first and second test bridging circuit completing a first electrical circuit including a particular individual one of said conductor pairs having a current present therein of a level as determined by the continuity or reversal of said last-mentioned individual one of said conductor pairs, said first test bridging circuit completing a second electrical circuit including portions of said last-mentioned individual one of said conductor pairs having a current present therein of a level as determined by the presence of a short between the conductors of said last-mentioned individual one of said conductor pairs.

5. An electrical test circuit as claimed in claim 4 in which said unilateral conducting elements of said first and second test bridging circuit each is of the semiconductor junction type.

6. Electrical test circuit apparatus for testing a conductor pair comprising a first and a second test bridging circuit each including a unilateral conducting element having a first resistance when forward biased and a second resistance when reverse biased, said first bridging circuit also including a potential source and current level indicating means, and means for connecting said first and second bridging circuits across one and the other end, respectively, of said conductor pair to cause a current in said indicating means as determined by said resistances of said unilateral conducting elements, said indicating means indicating: a first current level when each of said unilateral conducting elements is forward biased when said conductor pair is electrically continuous and parallel; a second current level when said conductor pair is shorted and one of said unilateral conducting elements is shunted; a third current level when one of said unilateral conducting elements is reverse biased when said conductor pair is reversed; and a fourth current level when either or both of the conductors of said conductor pairs are electrically open.

7. Electrical test circuit apparatus as claimed in claim 6 in which said connector means includes switch means for selectively connecting said first and second bridging circuits across said ends, respectively, of individual ones of a plurality of conductor pairs.

8. Electrical test circuit apparatus as claimed in claim 7 in which said first bridging circuit also includes resistance adjusting means for calibrating said current level indicating means.

* * * * *